(12) United States Patent
Ishinaga et al.

(10) Patent No.: US 6,709,081 B2
(45) Date of Patent: Mar. 23, 2004

(54) PRINTING SYSTEM, PRINTING METHOD, AND INK TANK

(75) Inventors: Hiroyuki Ishinaga, Tokyo (JP); Yoshinori Misumi, Tokyo (JP); Yoichi Taneya, Kanagawa (JP); Hiroyuki Sugiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/225,283

(22) Filed: Aug. 22, 2002

(65) Prior Publication Data

US 2003/0038966 A1 Feb. 27, 2003

(30) Foreign Application Priority Data

Aug. 24, 2001 (JP) ........................................ 2001-255013

(51) Int. Cl.[7] ................................................ B41J 29/38
(52) U.S. Cl. ........................................................... 347/5
(58) Field of Search ................ 347/5, 19, 1; 73/204.15; 399/42; 706/15, 22, 20, 23; 700/9, 19, 20, 22, 23, 11, 44, 45, 48, 49, 50

(56) References Cited

U.S. PATENT DOCUMENTS 6,513,118 B1 * 1/2003 Iwamura

FOREIGN PATENT DOCUMENTS

| EP | 1091275 | 4/2001 |
|---|---|---|
| EP | 1122941 | 8/2001 |

* cited by examiner

*Primary Examiner*—Raquel Yvette Gordon
(74) *Attorney, Agent, or Firm*—Fitzpatrick, Cella, Harper & Scinto

(57) ABSTRACT

An object of the present invention is to provide a printing system in which a user can obtain permission to use an encrypted copyrighted image by paying a royalty to a creator of the image so as to print the image, a printing method, and an ink tank which can be used to attain the printing system. The printing system comprises a computer and a printer which is connected to the computer. The computer can acquire an encrypted image with a print key which is distributed from an Internet distribution company. The printer has an ink tank replaceably mounted thereon, and the ink tank incorporates a security chip. The security chip contains a certificate key, generates a decryption key from a combination of the certificate key and the print key, and decrypts the encrypted image into print data which can be printed by the printer by use of the decryption key.

24 Claims, 3 Drawing Sheets

PRINTING SYSTEM, PRINTING METHOD, AND INK TANK

BACKGROUND OF THE INVENTION

1. Field of the Invention

The present invention relates to printing system and printing method for decrypting and printing encrypted image data acquired from a distributor, and an ink tank therefor.

2. Related Background Art

In general, copyrighted images made public on the Internet can be viewed by users who access them. However, to prevent the users from downloading and printing the copyrighted images on printers without paying royalties to creators of the images, i.e., without the creator's permissions, the copyrighted images made public on the Internet are generally encrypted.

Further, there is a case where a copyrighted image is made public on the Internet without being encrypted. In such a case, whoever accesses the copyrighted image can print the image without paying a royalty to its creator, i.e., without the creator's permission. Thus, in the case where a copyrighted image is made public on the Internet without being encrypted, each user is given a free hand to pay a royalty for the image to its creator. Therefore, payment of the royalty may not always be made, and there is a possibility that the creator may lose profits he should obtain.

As described above, in a case where a copyrighted image made public on the Internet is encrypted, the encrypted copyrighted image cannot be printed out and used, whereby use of the copyrighted image is restricted. As for such a copyrighted image, users should be permitted to download or print the copyrighted image by paying a royalty so as to remove a restriction on use of the copyrighted image. However, to pay the royalty or permit the users to use the copyrighted image after payment of the royalty, a number of procedures are required between the users and its creator, and a high-speed system taking advantage of a network has heretofore not been established yet.

Under the above circumstances, establishment of a system in which a user acquires permission to use an encrypted copyrighted image by paying a royalty to a creator of the copyrighted image when the user attempts to print the copyrighted image, is desired.

SUMMARY OF THE INVENTION

It is an object of the present invention to provide a printing system and a printing method in which a user is permitted to use encrypted copyrighted image data by paying a royalty to a creator of the copyrighted image so as to print the copyrighted image.

A first aspect of the present invention is directed to a printing system constituted by a printing apparatus for printing an image and an external apparatus which is connected to the printing apparatus and has a function of connecting to a network, the system comprising: decryption key storing means for storing a decryption key code to decrypt encrypted image data acquired from a distributor which is connected via the network, and decryption means for decrypting the encrypted image data acquired by the external apparatus from the distributor via the network, by use of the decryption key code, wherein the printing apparatus prints an image in accordance with the image data decrypted by the decryption means.

A second aspect of the present invention is directed to a printing system constituted by a printing apparatus for printing an image and an external apparatus which is connected to the printing apparatus and has a function of connecting to a network. In the system, the external apparatus comprises means for sending to the printing apparatus encrypted image data acquired from a distributor which is connected to the external apparatus via the network, and the encrypted image data contains a first key code to be used for decryption of the image data. The printing apparatus comprises means for storing a second key code which is registered in the distributor and used for decryption of the image data, and decryption key generating means for generating a decryption key code to decrypt the image data from the first key code contained in the encrypted image data acquired by the external apparatus and the second key code. The printing system comprises decryption means for decrypting the encrypted image data acquired by the external apparatus via the network, by using the decryption key code, so as to generate image data which can be printed by the printing apparatus.

A third aspect of the present invention is directed to a printing method in a printing apparatus which is constituted so as to be able to connect to an external apparatus having a function of connecting to a network and prints an image in accordance with image data, the method comprising the steps of: acquiring encrypted image data by the external apparatus from a distributor which is connected to the external apparatus via the network, reading a decryption key code used to decrypt the encrypted image data from the printing apparatus, the decryption key code being data registered in the distributor, decrypting the encrypted image data by use of the decryption key code so as to acquire image data which can be printed by the printing apparatus, and printing an image based on the image data acquired in the decryption step.

A fourth aspect of the present invention is directed to a printing method in a printing apparatus which is constituted so as to be able to connect to an external apparatus having a function of connecting to a network and prints an image in accordance with image data, the method comprising the steps of: acquiring encrypted image data by the external apparatus from a distributor which is connected to the external apparatus via the network, the encrypted image data having a first key code used for decryption, reading a second decryption key code used to decrypt the encrypted image data from the printing apparatus, the second key code being data registered in the distributor, generating a decryption key code to decrypt the encrypted image data from the first key code and the second key code, decrypting the encrypted image data by use of the decryption key code so as to acquire image data which can be printed by the printing apparatus, and printing an image based on the image data acquired in the decryption step.

A fifth aspect of the present invention is directed to an ink tank which is replaceably mounted on an ink jet recording apparatus and which accommodates inks to be fed to an ink jet recording head that is provided in the ink jet recording apparatus and discharges inks, comprising: means for storing a certificate key, decryption key generating means for generating a decryption key code to decrypt encrypted image data sent from the ink jet recording apparatus from a print key attached to the encrypted image data and used to decrypt the encrypted image data and the certificate key, the encrypted image data is image data which has been subjected to an encryption process, and decryption means for decrypting the encrypted image data in accordance with the decryption key code generated by the decryption key generating means, wherein the image data decrypted by the decryption means is recorded by the ink jet recording apparatus.

DESCRIPTION OF THE PREFERRED EMBODIMENT

Hereinafter, an embodiment of the present invention will be described with reference to the drawings.

Figure 1:
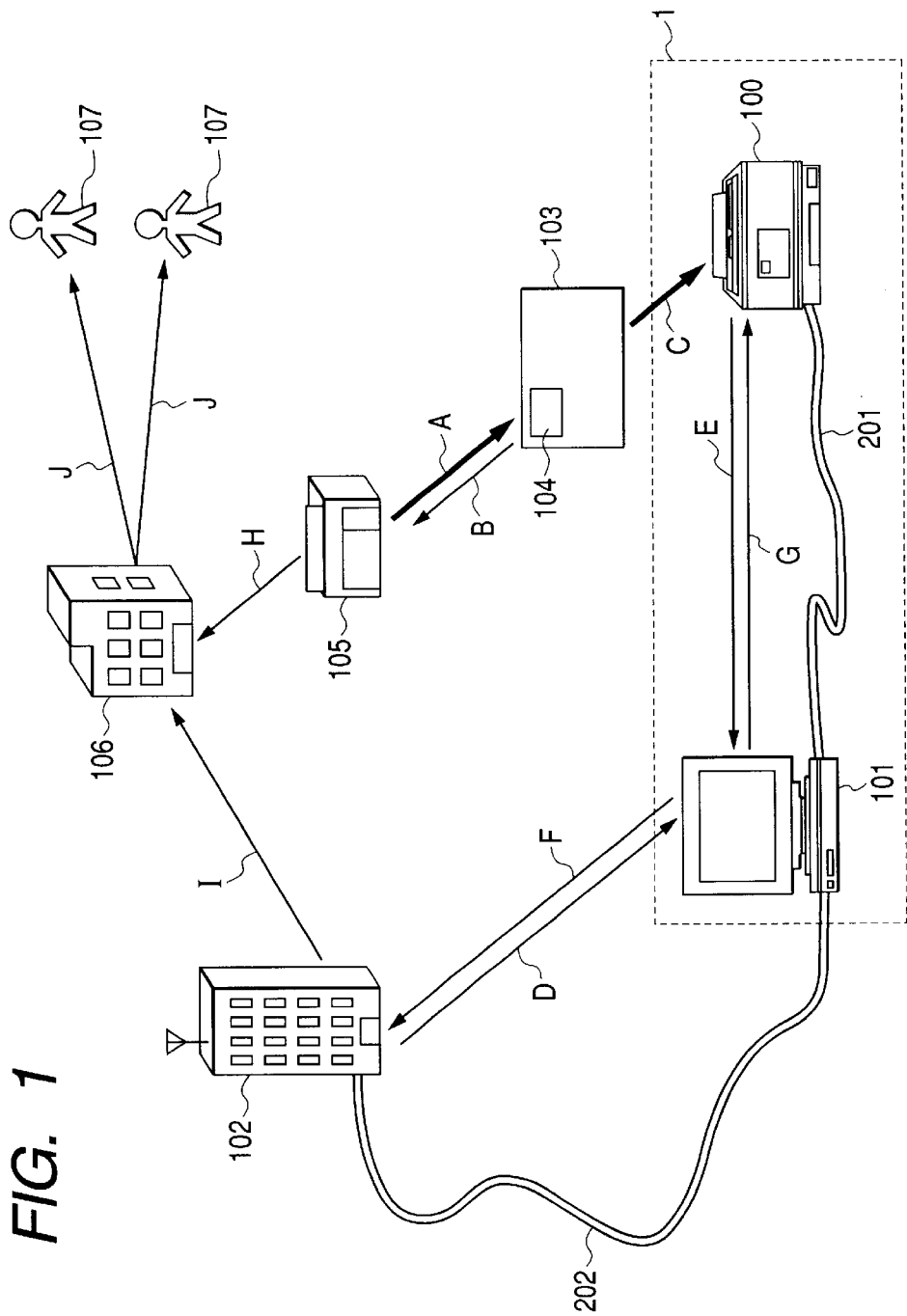
FIG. 1 is a schematic block diagram illustrating a constitution of a printing system according to an embodiment of the present invention.

FIG. 1 is a block diagram showing a constitution of a printing system according to the embodiment of the present invention and flows of royalties, data and objects in association with a copyright.

A printing system 1 is constituted by a printer 100 as a printing apparatus for printing an image on a recording medium and a computer 101 as an external apparatus to be connected to the outside of the printing apparatus. Further, as will be described later, the computer 101 is configured such that it can be connected to the Internet which is a computer network by use of a communication protocol.

As shown in FIG. 1, the printing system 1 is constituted by the computer 101 and the printer 100 which is connected to the computer 101. The computer 101 is connected to the printer 100 via a cable 201. As means for connecting the computer 101 to the printer, a variety of means including means using an ordinary serial cable, USB and IEEE1394 can be employed. The computer 101 serves as a host apparatus which provides the printer 100 with image data of an image to be recorded or operates the printer 100.

Further, the computer 101 has an Internet function and is capable of connecting to the Internet by use of a communication protocol so as to acquire an encrypted image with a print key which is distributed from an Internet distribution company 102. In FIG. 1, 202 schematically shows a state of the computer 101 being connected to the Internet. The computer 101 is connected to the Internet via a telephone line, LAN or a combination of these.

The encrypted image with a print key which is distributed from the Internet distribution company 102 is a copyrighted image. The copyrighted image is an image which requires users to pay a royalty to a creator of the image so as to obtain permission to use the image when the users desire to, for instance, print the image.

The printer 100 is an ink jet color printer, and an ink tank 103 which accommodates a plurality of color inks is replaceably mounted on the color printer. The ink tank 103 is mounted on the printer 100 in such a manner that it feeds inks to ink jet heads which discharges inks.

The ink tank 103 incorporates a security chip 104. The security chip 104 contains a certificate key which is registered in the Internet distribution company 102. Further, the security chip 104 comprises an integrated circuit for implementing (1) a function of generating a decryption key code required for decrypting the encrypted image with a print key which has been obtained by the computer 101 via the Internet, by a combination of the print key and the certificate key, and (2) a function of decrypting the encrypted image into print data which can be processed by the printer 100 by use of the generated decryption key code key. The certificate key is stored in a memory having a function of storage means in the chip 104.

Hereinafter, procedures to print an encrypted image with a print key which has been distributed from the Internet distribution company 102 by the present printing system will be described with reference to FIGS. 2 and 3.

Figure 2:
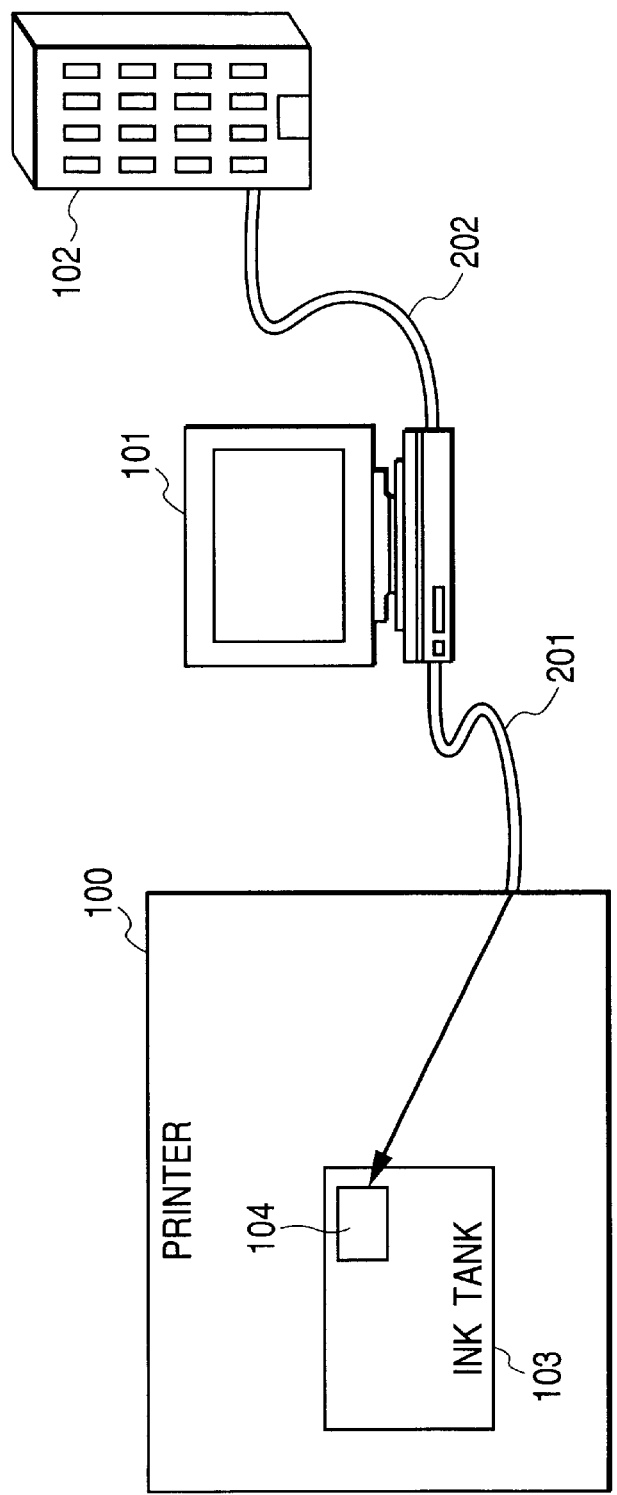
FIG. 2 is a schematic diagram showing procedures performed when an encrypted image with a print key which is distributed from an Internet distribution company 102 is printed out by the printing system of FIG. 1.

FIG. 2 is a schematic diagram illustrating procedures to print an encrypted image with a print key which has been distributed from the Internet distribution company 102 by the printing system of FIG. 1. Further, FIG. 3 is a schematic diagram showing procedures to decrypt an encrypted image by the security chip 104 of the ink tank mounted on the printer of FIG. 1 and shows processes to decrypt encrypted image data by use of a certificate key 301 which is data to be stored in the chip 104, and the encrypted image data and a print key which are data to be acquired via the computer 101.

Referring to FIG. 2, firstly, in a store 105, a user purchases an ink tank 103 which incorporates a security chip 104 for making an image (copyrighted image) with a print key printable (as indicated by A in FIG. 1). A purchase price of the ink tank 103 includes a cost of the ink tank itself (i.e., a fee to purchase the ink tank itself) and a royalty as a fee to use the copyrighted image. The royalty is paid to the store 105 (as indicated by B in FIG. 1). Then, the royalty is paid to a copyright association 106 (as indicated by H in FIG. 1). The purchased ink tank 103 is mounted on a printer 100 owned by the user (as indicated by C in FIG. 1).

Then, the user operates a computer 101 so as to download a desired encrypted image with a print key from an Internet distribution company 102 via a public line or the like (as indicated by D in FIG. 1). The encrypted image with a print key, as described above, is a copyrighted image and is encrypted so as not to be printed out as it is. The downloaded encrypted-image is input to the printer 100 from the computer 101 (as indicated by G in FIG. 1).

Figure 3:
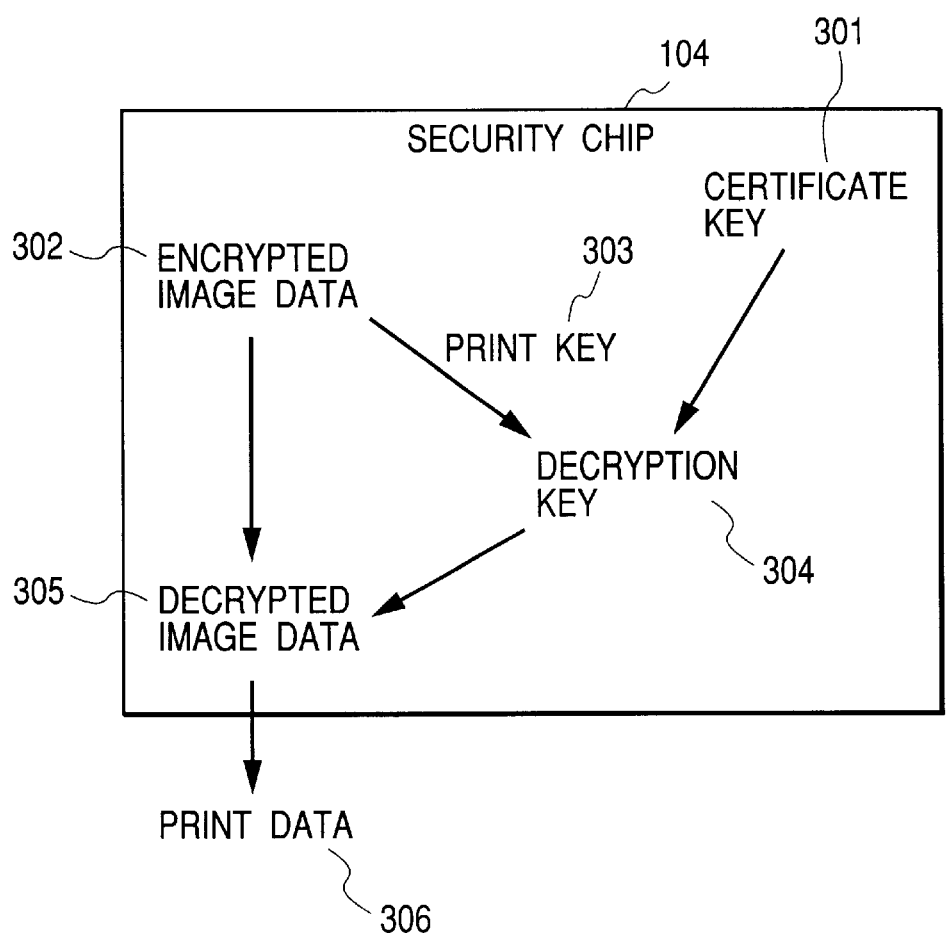
FIG. 3 is a schematic diagram showing procedures of decryption of an encrypted image by a security chip of an ink tank mounted on a printer shown in FIG. 1.

In FIG. 3, reference numeral 301 indicates a certificate key to be stored in the security chip. Further, reference numeral 302 indicates data (encrypted image data) of the copyrighted image input into the printer 100 from the computer 101, and the encrypted image data has a print key 303 attached thereto.

In the printer 100 into which the encrypted image data has been input, as shown in FIG. 3, the security chip 104 generates a decryption key 304 from a combination of the print key 303 which is attached to the encrypted image data 302 and the certificate key 301 which is stored in advance in the security chip. Further, the generated decryption key 304 is temporarily stored in the security chip 104. The encrypted image data 302 is decrypted by use of the decryption key 304 in the security chip 104 so as to obtain decrypted image data 305, and the security chip 104 outputs the decrypted image data 305 as print data 306. Then, the print data 306 is printed by the printer 100.

According to the above-described constitution, the encrypted image 305 can be decrypted by the decrypting key 304 that is generated from a combination of the print key 303 which is attached to the encrypted image 302 and the certificate key 301 which is stored in advance in the security chip 104 in the purchased ink tank 103. In this constitution, the encrypted image 302 cannot be decrypted by only either one of the print key 303 which is attached to the encrypted image 302 and the certificate key 301. Further, the system is constituted such that the decrypted image data 305 cannot be stored in the computer 101, nor in the printer 100. By such a constitution, an unauthorized use of a copyrighted image can be prevented, and copyrighted images and rights of creators can be protected.

Meanwhile, after the encrypted image is decrypted, data informing that decryption of the encrypted image has been performed and the certificate key (as indicated by E in FIG. 1) are sent to the Internet distribution company 102 via the computer 101 (as indicated by F in FIG. 1). Thereby, it can be notified that a royalty for the copyrighted product is to be paid. Thus, a function of sending the data and the certificate key is achieved by connecting the computer 101, the printer 100 and the Internet distribution company 102 to each other as shown in FIGS. 1 and 2.

Then, after receiving the above data and certificate key, the Internet distribution company 102 notifies the copyright association 106 of which copyrighted product has been printed (or used) (as indicated by I in FIG. 1). Based on the notification, the copyright association 106 pays a predetermined royalty to a corresponding creator 107 (as indicated by J in FIG. 1).

As described above, in the embodiment of the present invention, the encrypted image acquired from the Internet distribution company 102 is decrypted into print data which can be processed by the printer 100 by means of the security chip 104 which is incorporated in the ink tank 103. Therefore, when a user prints the encrypted copyrighted image, the user is permitted to use the copyrighted image by the security chip 104, and once the encrypted image data is decrypted, data notifying the decryption is sent to the Internet distribution company 102, which then pays a royalty to the creator of the image.

Further, the constitution of the present embodiment is such that the security chip 104 generates the decryption key required for decrypting the encrypted image with a print key which has been acquired by means of the computer 101 from a combination of the above print key and the above certificate key, and decrypts the encrypted image by use of the generated decryption key. However, in place of the above constitution, the present embodiment may also be constituted such that the security chip 104 only generates the decryption key from a combination of the above print key and the above certificate key and decryption of the encrypted image by use of the decryption key is conducted in an internal arrangement of the printers or by the computer's processing.

In addition, the present embodiment may also be constituted such that an encrypted image having no print key attached thereto is distributed from the Internet distribution company 102, a decryption key required for decrypting the encrypted image is stored in the security chip, and the encrypted image is decrypted by use of the decryption key. In this case as well, if a royalty is included in the purchase price of the ink tank incorporating the above security chip, the royalty can be paid to a creator of the image for a print of the copyrighted encrypted image.

Furthermore, although the color ink jet printer is used in the present embodiment, a black and white ink jet printer may be used.

As described above, the printing system of the present invention comprises decryption key storing means for storing a decryption key code registered in a distributor, and decryption means for decrypting acquired encrypted image data into image data which can be printed by a printing apparatus by use of the decryption key code stored in the decryption key storing means. Therefore, when a user prints an encrypted copyrighted image, the user can acquire permission to use the image by paying a royalty to a creator of the image.

Further, decrypted images can be protected from an unauthorized use and the like by setting the printing system such that storage of the decrypted image data is prevented.

The printing system of the present invention comprises decryption key generating means for storing a second key code registered in a distributor and generating a decryption key code required for decrypting encrypted image data acquired by an external apparatus from a combination of a first key code and the above second key code, and decryption means for decrypting the acquired encrypted image data into image data which can be printed by a printing apparatus by use of the decryption key code generated by the decryption key generating means. Therefore, when a user prints an encrypted copyrighted image, the user can acquire permission to use the image by paying a royalty to a creator of the image.

Further, decrypted images can be protected from an unauthorized use and the like by setting the printing system such that storage of the decrypted image data is prevented.

Further, the printing method by the printer 100 in the above embodiment comprises the steps of reading a decryption key code registered in a distributor from storage means, and decrypting acquired encrypted image data into image data which can be printed by the printing apparatus by use of the decryption key code read from the storage means. Therefore, when a user prints an encrypted copyrighted image, the user can acquire permission to use the image by paying a royalty to a creator of the image.

Further, decrypted images can be protected from an unauthorized use and the like by setting the printing method such that storage of the decrypted image data is prevented.

The printing method of the present invention comprises the steps of generating a decryption key code required for decrypting encrypted image data acquired by an external apparatus from a combination of a first key code and a second key code registered in a distributor, and decrypting the acquired encrypted image data into image data which can be printed by a printing apparatus by use of the generated decryption key code. Therefore, when a user prints an encrypted copyrighted image, the user can acquire permission to use the image by paying a royalty to a creator of the image.

Further, decrypted images can be protected from an unauthorized use and the like by setting the printing method such that storage of the decrypted image data is prevented.

What is claimed is:

1. A printing system constituted by a printing apparatus for printing an image and an external apparatus which is connected to the printing apparatus and has a function of connecting to a network, the system comprising:

decryption key storing means for storing a decryption key code to decrypt encrypted image data acquired from a distributor which is connected via the network, and decryption means for decrypting the encrypted image data acquired by the external apparatus from the distributor via the network, by use of the decryption key code, wherein the printing apparatus prints an image in accordance with the image data decrypted by the decryption means.

2. The system of claim 1, wherein the printing apparatus is an ink jet printer having an ink tank replaceably mounted thereon, and the decryption key storing means is incorporated in the ink tank.

3. The system of claim 2, wherein the decryption means is incorporated in either the external apparatus or the printing apparatus.

4. The system of claim 1, wherein the printing apparatus is an ink jet printer having an ink tank replaceably mounted thereon, and both the decryption key storing means and the decryption means are incorporated in the ink tank.

5. The system of claim 1, wherein the decryption means prohibits storage of the image data obtained by decryption.

6. The system of claim 1, wherein the external apparatus notifies the distributor of data indicating that the decrypted image data has been printed and the decryption key code when the image data obtained by decryption has been printed.

7. A printing system constituted by a printing apparatus for printing an image and an external apparatus which is connected to the printing apparatus and has a function of connecting to a network, the external apparatus comprising:
  means for sending to the printing apparatus encrypted image data acquired from a distributor which is connected to the external apparatus via the network, said encrypted image data containing a first key code to be used for decryption of the image data;

the printing apparatus comprising:
  means for storing a second key code which is registered in the distributor and used for decryption of the image data, and
  decryption key generating means for generating a decryption key code to decrypt the image data from the first key code contained in the encrypted image data acquired by the external apparatus and the second key code; and the printing system comprising:
  decryption means for decrypting the encrypted image data acquired by the external apparatus via the network, by using the decryption key code, so as to generate image data which can be printed by the printing apparatus.

8. The system of claim 7, wherein the printing apparatus is an ink jet printer having an ink tank replaceably mounted thereon, and the decryption key generating means is incorporated in the ink tank.

9. The system of claim 8, wherein the decryption means is incorporated in either the external apparatus or the printing apparatus.

10. The system of claim 8, wherein the decryption key generating means and the decryption means are incorporated in the ink tank.

11. The system of claim 7, wherein the decryption means prohibits storage of the decrypted image data.

12. The system of claim 7, wherein the external apparatus has notification means for notifying the distributor connected to the external apparatus via the network of data indicating that the image data has been decrypted and the decryption key code when the decrypted image data has been printed by the printing apparatus.

13. A printing method in a printing apparatus which is constituted so as to be able to connect to an external apparatus having a function of connecting to a network and prints an image in accordance with image data, the method comprising the steps of:
  acquiring encrypted image data by the external apparatus from a distributor which is connected to the external apparatus via the network,
  reading a decryption key code used to decrypt the encrypted image data from the printing apparatus, the decryption key code being data registered in the distributor,
  decrypting the encrypted image data by use of the decryption key code so as to acquire image data which can be printed by the printing apparatus, and
  printing an image based on the image data acquired in the decryption step.

14. The method of claim 13, wherein the printing apparatus is an ink jet printing apparatus having an ink tank replaceably mounted thereon, and in the read-out step, the decryption key code is read from storage means provided in the ink tank.

15. The method of claim 13, wherein decryption of the encrypted image data is carried out by a circuit provided in the ink tank.

16. The method of claim 13, further comprising a step of setting prohibition of the storage of the image data acquired in the decryption step.

17. The method of claim 13, further comprising a step of notifying the distributor of data indicating that the decrypted image data has been printed and the decryption key code via the network when the image has been printed in the printing step.

18. A printing method in a printing apparatus which is constituted so as to be able to connect to an external apparatus having a function of connecting to a network and prints an image in accordance with image data, the method comprising the steps of:
  acquiring encrypted image data by the external apparatus from a distributor which is connected to the external apparatus via the network, the encrypted image data having a first key code used for decryption,
  reading a second decryption key code used to decrypt the encrypted image data from the printing apparatus, the second key code being data registered in the distributor,
  generating a decryption key code to decrypt the encrypted image data from the first key code and the second key code,
  decrypting the encrypted image data by use of the decryption key code so as to acquire image data which can be printed by the printing apparatus, and
  printing an image based on the image data acquired in the decryption step.

19. The method of claim 18, wherein the printing apparatus is an ink jet printer having an ink tank replaceably mounted thereon, and generation of the decryption key code is carried out by a circuit provided in the ink tank.

20. The method of claim 19, wherein decryption of the encrypted image data is carried out by a circuit provided in the ink tank.

21. The method of claim 18, further comprising a step of setting prohibition of the storage of the image data acquired in the decryption step.

22. The method of claim 18, further comprising a step of notifying the distributor of data indicating that the decrypted image data has been printed and the decryption key code via the network when the image has been printed in the printing step.

23. An ink tank which is replaceably mounted on an ink jet recording apparatus and which accommodates inks to be fed to an ink jet recording head that is provided in the ink jet recording apparatus and discharges inks, comprising:
  means for storing a certificate key,
  decryption key generating means for generating a decryption key code to decrypt encrypted image data sent from the ink jet recording apparatus from a print key attached to the encrypted image data and used to decrypt the encrypted image data and the certificate key, the encrypted image data is image data which has been subjected to an encryption process, and decryption means for decrypting the encrypted image data in accordance with the decryption key code generated by the decryption key generating means, wherein the image data decrypted by the decryption means is recorded by the ink jet recording apparatus.

24. The ink tank of claim 23, wherein the encrypted image data is image data acquired by an external apparatus which is connected to the ink jet recording apparatus, from a distributor via a network, and the certificate key is data registered in the distributor.

* * * * *